(12) United States Patent
Tsang et al.

(10) Patent No.: US 7,720,016 B2
(45) Date of Patent: May 18, 2010

(54) MULTI-HOP ROUTING METHOD WITH BANDWIDTH RESERVATION IN WIRELESS NETWORK

(75) Inventors: Yui Ming Tsang, Hong Kong (CN); Jun Chen, Hong Kong (CN); Raymond Yan Lam Lee, Hong Kong (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 777 days.

(21) Appl. No.: 11/262,087

(22) Filed: Oct. 28, 2005

(65) Prior Publication Data

US 2007/0097892 A1 May 3, 2007

(51) Int. Cl.
*H04B 7/00* (2006.01)

(52) U.S. Cl. .................. 370/310; 455/428; 455/445; 370/237; 370/238; 370/328; 370/351; 370/393; 370/355; 370/356; 370/392; 370/397; 370/399; 370/395.31; 370/395.32; 370/409; 370/338; 370/400; 370/468

(58) Field of Classification Search ............ 455/428, 455/445; 370/237, 238, 328.1, 351, 355, 370/356, 393, 397, 399
See application file for complete search history.

(56) References Cited

U.S. PATENT DOCUMENTS

| | | | | |
|---|---|---|---|---|
| 5,790,522 | A * | 8/1998 | Fichou et al. | 370/236 |
| 6,965,568 | B1 * | 11/2005 | Larsen | 370/238 |
| 2001/0033557 | A1 * | 10/2001 | Amalfitano | 370/335 |
| 2002/0080816 | A1 * | 6/2002 | Spinar et al. | 370/449 |
| 2003/0161330 | A1 * | 8/2003 | Umeda | 370/400 |
| 2004/0022224 | A1 * | 2/2004 | Billhartz | 370/338 |
| 2004/0048618 | A1 * | 3/2004 | O'neill et al. | 455/445 |
| 2006/0285529 | A1 * | 12/2006 | Hares et al. | 370/338 |
| 2007/0041345 | A1 * | 2/2007 | Yarvis et al. | 370/331 |

FOREIGN PATENT DOCUMENTS

CN 1564544 A 1/2005

OTHER PUBLICATIONS

Perkins, C. et al., "Ad hoc On-Demand Distance Vector (AODV) Routing," http://moment.cs.ucsb.edu/pub/rfc3561.txt, RFC 3561, Network Working Group, Jul. 2003, pp. 1-37 (printed as 33 pages due to pagination differences from web site), The Internet Society.

* cited by examiner

*Primary Examiner*—Ajit Patel
*Assistant Examiner*—Nimesh Patel
(74) *Attorney, Agent, or Firm*—Fulbright & Jaworski L.L.P.

(57) ABSTRACT

A routing method for communication from a source node to a destination node in a distributed wireless network which comprises a plurality of wireless mobile nodes. The method has the following steps: (1) a query step where the source node sends a route request query, which is relayed by one or more mobile nodes along one or more paths to the destination node; (2) a route reply step where the destination node upon receiving the route request query sends a route reply packet, which is relayed by one or more mobile nodes along one or more selected paths back to the source node; (3) a bandwidth reservation step performed during the same time when step (2) is performed, where each said mobile node that receives said route reply packet carries out bandwidth reservation, resulting one or more paths with bandwidth reservation from said source node to said destination node; (4) an outgoing path selection step where a single path is selected from the paths with bandwidth reservation resulted in step (3); and (5) a proactive erasure step where each mobile node which has bandwidth reservation but is not in the path selected in step (4) removes its bandwidth reservation.

13 Claims, 13 Drawing Sheets

MULTI-HOP ROUTING METHOD WITH BANDWIDTH RESERVATION IN WIRELESS NETWORK

BACKGROUND OF THE INVENTION

1. Field of the Invention

This invention relates to a method and system for wireless communication in fully distributed wireless networks. Particularly, it relates to a multihop routing method in a wireless communication network where each device or node is used as a packet carrier and forwarder and the packet is relayed to from the source to the destination hop by hop.

2. Description of the Related Art

Ultra-Wideband (UWB) technology is developed for bringing the convenience and mobility of wireless communications to high-speed interconnects in devices use in home and office environments. Designed for short-range, wireless personal area networks (WPANs), UWB is the technology for freeing people from wires, enabling wireless connection of multiple devices for transmission of video, audio and other high-bandwidth data. Based on short-range radio communication, UWB complements other longer range radio technologies such as Wi-Fi, WiMAX, and cellular wide area communications. It is used to relay data from a host device to other devices in the immediate area (up to 10 meters, or 30 feet).

While UWB is advantageous in terms of low power consumption, and high data rate, it also has the limitation of short transmission range (maximum 10 meters). This shortcoming cannot be overcome by simply increasing transmitting power because it would violates FCC regulations and shorten the device's battery life. Based on a new multi-hop routing method, one object of the present invention is to provide a solution to UWB's problems related to the short-range transmission.

Routing protocols in a device have been used to extend its communication coverage beyond its neighboring devices. The main task is to route information packets from the source device to the destination device which does not have a direct connection with the source device. In the wired network such as Internet where the network topology is quite stable, the routing protocol periodically updates the network topology information so that the path to every destination is known before routing the packet. Those routing protocols are categorized as proactive routing protocol.

However, in wireless networks such as those based on the UWB technology, the topology can change quite rapidly. The devices in the wireless network are movable and the channel conditions are changing. The topology information at a time may not be valid after a period of time. For these reasons, reactive routing protocol, instead of proactive routing protocol, was proposed for wireless networks. Reactive routing protocol does not maintain the network topology information.

Bandwidth Reservation along a path was first proposed in Resource Reservation Setup Protocol (RSVP) for wired networks. It reserves the path from a device to a device, starting from the destination. As it is used in wired network, the whole network topology is known in advance. Hence, each routing device could be able to direct the bandwidth reservation request to the source very efficiently. However, such method of bandwidth reservation has difficulties when used in wireless networks. First, the network topology information that each device maintains is very limited. Second, there is the hidden node problem where the bandwidth reservation with two parties may affect the bandwidth utilization of the neighbors around the parties. This makes the reservations among the devices inter-dependent. Third, the channel quality is unstable in a wireless network. Some QoS performance may be required to maintain in order to have a stable path.

To deal with the hidden node problem in wireless network, Lin, et al. proposed a method that can avoid the hidden node problem and at the same time also optimize the bandwidth utilization (Lin C. R. et al., *QoS Routing in ad Hoc Wireless Networks*, IEEE Journal on Selected Areas in Comm., August 1999). However, it requires that the route discovery stage be finished before the bandwidth reservation starts. This introduces two problems: slow response time and low successful rate. This is mainly because the method separates the bandwidth reservation stage from the route discovery stage.

To deal with the limited network topology problems and improve the response time and successful rate, it has been suggested to combine the bandwidth reservation stage with the route discovery stage and to support multipath reservation. It has been further suggested to introduce an additional status for the slots that bandwidth reserved to deal with the potential hidden node problem (a slot is used in TDMA system as a unit of bandwidth). By doing so, the successful rate and response time are improved. However, the amount of redundant bandwidth reservation is increased significantly and likely to offset the improvement made on the successful rate. Therefore, modifications on the routing method are needed to overcome the problems encountered in the art.

SUMMARY OF THE INVENTION

It is an object of this invention to provide an improved wireless communication system and method useful for extending the distance between the source device and the destination device in wireless networks which include a plurality of wireless mobile devices or nodes interconnected by a plurality of wireless communication links and has the following characteristics:

(a) there are no centralized nodes which manage the activities of the network;

(b) all the nodes are working in a distributed manner;

(c) a multiple access scheme, such as TDMA, is used; and (d) all the nodes should be able to obtain the neighboring nodal information of its neighbors. (i.e., each node obtains information of the nodes which are more than one hop away).

The system and method are implemented with three main components as shown in FIG. 2. They are (a) Route Discovery Entity, (b) Path Management Entity and (c) Slot Management Entity.

The Route Discovery Entity performs (a) the route discovery task using any reactive routing protocols or hybrid protocols, (b) calculation of QoS performance metrics for each potential routes or path (QoS metrics may include, but not limit to, minimum hops, channel condition and power consumption but exclude bandwidth consumption), and (c) selection of a set of acceptable paths based on QoS metrics.

The Path Management Entity performs (a) path selection to select paths that best utilize the bandwidth consumption among the paths given by Route Discovery Entity (multipath reservation is supported), (b) proactive erasure of path reservation when the path is declared as redundant, and (c) maintenance and repair of the broken path based on the more-than-1-hop information.

Slot Management Entity performs (a) selection of a set of slots for reservation upon request from the source nodes and (b) provides a forbidden bitmap mechanism to solve the hidden node problem.

The above system and method provided by the present invention can: (a) provide bandwidth guaranteed paths from the source device to destination device; (b) provide an acceptable QoS performance to the bandwidth guaranteed paths; (c) provide fast response; (d) improve the successful rate; (e) solve the hidden node problem and reduce the amount of redundant bandwidth reservation; and (f) make full use of more than 1 hop information.

DETAILED DESCRIPTION OF THE PRESENT INVENTION

Network Model

The invention is working in a fully distributed network. The network includes a plurality of wireless mobile nodes connected by a plurality of wireless communication links. No centralized nodes are needed to manage the activities of the network. There are routing nodes and client nodes in the networks. A client node is an end-node which only acts as a source or a destination but does not act as intermediate node along the route. A routing node acts as a router which can be an intermediate node along the route and can also act as an end-node of a route. A "distributed network" is a network in which each member of network has equal privilege and right to gain access to control of network and the sharing of resources is done thru negotiation among the member in the network. A "node" means a device which is participating data transmission within the network.

Each node should be able to obtain the neighboring nodal information of its neighbor. The neighboring nodal information contains at least the device identifiers of its neighboring nodes. To do this, each node may broadcast its neighboring nodal information through a periodic packet such as beacons or each node can probe its neighbors about the information they have. In some embodiments, the neighboring nodal information from node A is regarded as the two-hop info from node A.

Network Architecture

Figure 1:
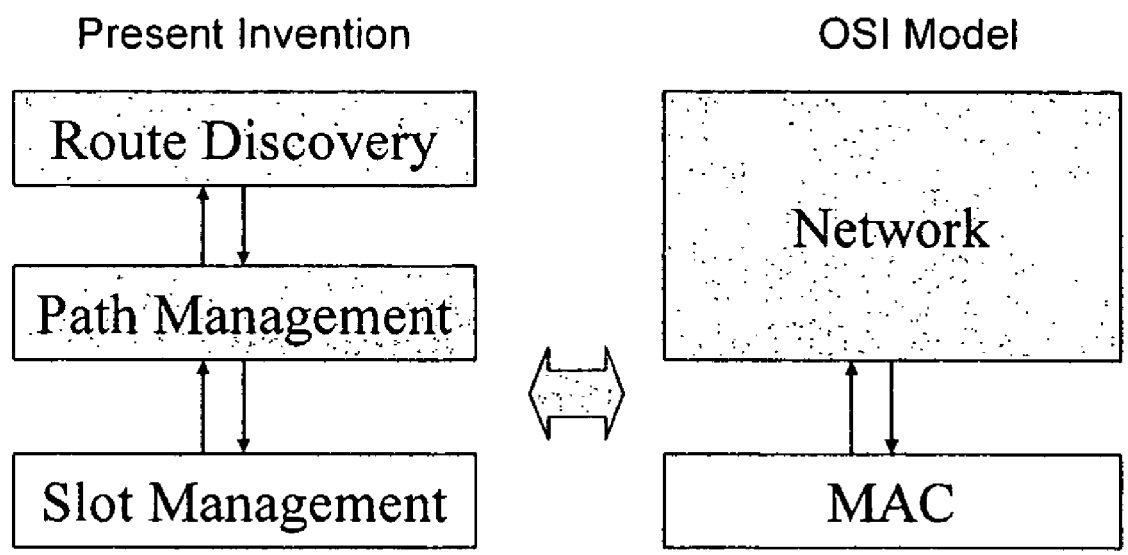
FIG. 1 shows the system model of the present invention and corresponding OSI model.

The system of some embodiments is structured in the architecture shown in FIG. 1 with reference to the OSI model. Route Discovery Entity and Path Management Entity are corresponding to network layer (layer 3) of the OSI model while Slot Management Entity is corresponding to MAC layer (layer 2) of the OSI model. The modular diagram of each entity and the interaction among the entities are shown in FIG. 2 and FIG. 3, respectively.

Route Discovery Entity controls the operation of packet routing in a node, carries out operations to discover a possible route to destination node and evaluates the QoS performance of each possible route to the destination. The above operations are carried by two modules residing in this entity: Route discovery module and QoS processor, as shown in FIG. 2. Route discovery module contains a routing protocol for discovering the route to the destination node. Its operation relies on the routing protocol that is implemented in the route discovery entity. It requires the routing protocol to be reactive and any reactive protocol, such as, AODV, DSR, ZRP, can be used as routing protocol. Take AODV as an example. The main task is processing the Route Request Query (RREQ) packet and the Route Reply (RREP) packet. Referring to FIG. 3, the source node generates a RREQ packet to the neighboring nodes to query the existence of the destination. The destination node is responsible for generating RREP packet upon the reception of RREQ packet. Upon receiving RREQ packet, the routing node checks the existence of the destination and records the RREQ packet. If the destination is not known, it will forward the RREQ packet to its neighboring nodes. When the RREP packet is received, the routing node will also forwards the packet back towards to the direction towards source node. "Route Request Query packet" here means a packet which is sent to the neighboring node to query its neighbors about the availability of the destination node. "Route Reply packet" here means a packet which is sent to notify the source of route query result, the existence of the destination and the possible path to the destination."

Figure 3:
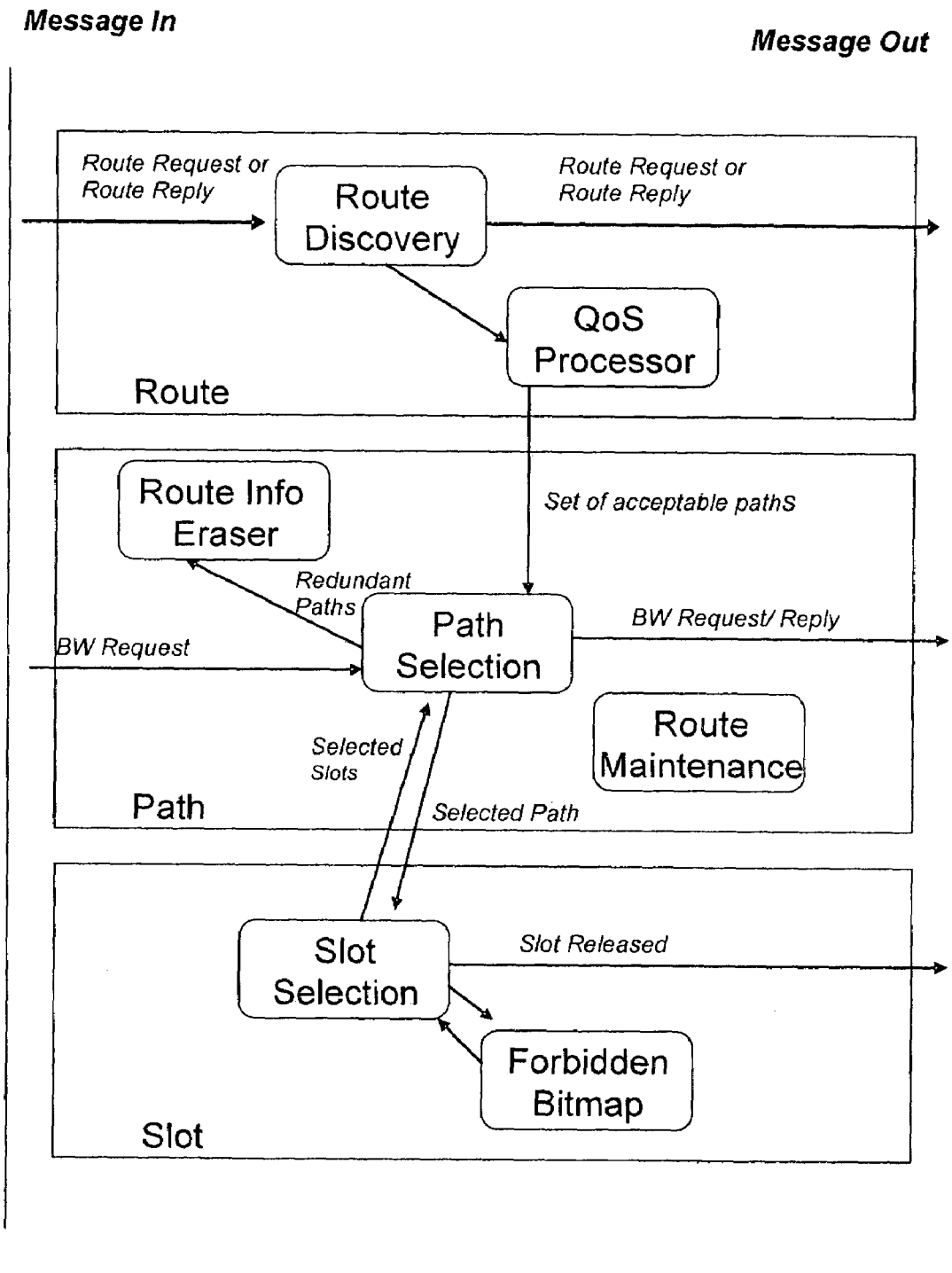
FIG. 3 shows the flows among the entities of FIG. 2

Continuing with FIG. 3, QoS processor module carries out its process at request by route discovery module during its processing the packets required in route discovery such as RREQ and RREP packets. The module records a set of neighboring nodes from which forward routing packets. It then assesses the QoS metrics for each route formed through the recorded neighbors. The QoS metrics obtained and the path information will then be passed to path management entity for further processing.

Figure 2:
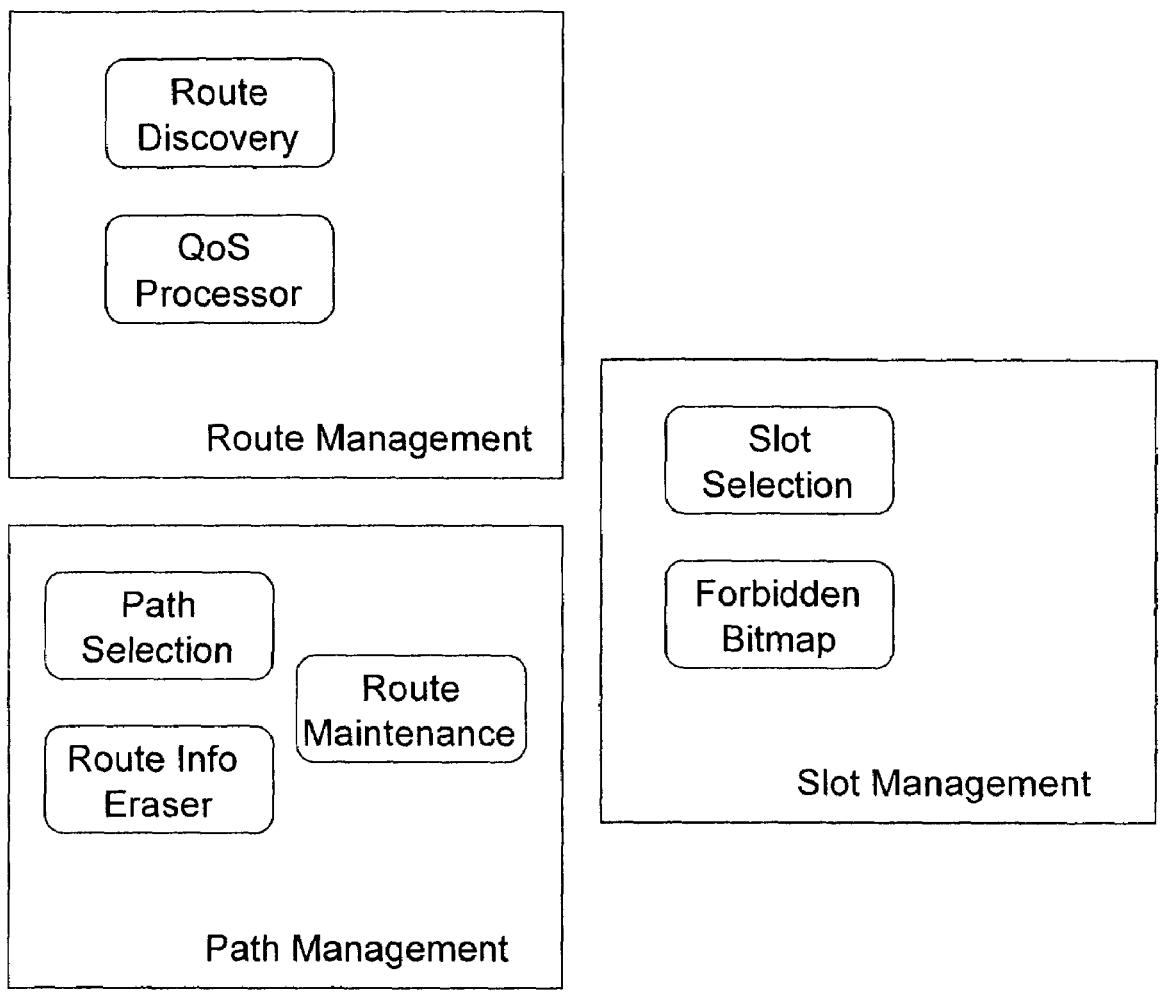
FIG. 2 provides block diagrams for the three entities in the system model of the present invention.

As indicated in FIG. 2, Path Management Entity is responsible for the establishment and maintenance of a path from the source node to the destination node. It consists of path selection module, route info eraser module and route maintenance module. Referring to FIG. 3, upon reception of the routing information from the route discovery entity, path selection module will choose a path or a set of path(s) that minimize the bandwidth consumption as well as optimize the QoS requirement. Then, the bandwidth reservation will be carried out. If part of the established path is broken, route maintenance module is required to recover the path. But on the other hand, since there may be more than one path that have been established during route requesting stage, a set of redundant path will be erased proactively by route info eraser module to reduce network BW consumption.

Slot Management Entity is responsible for choosing slots for bandwidth reservation. Referring to FIG. 2, it consists of a slot selection module and a forbidden bitmap module. As shown in FIG. 3, upon reception of request from the path management entity for bandwidth reservation, it will choose a set of slots that are available to reserve. The slot is said to be available if it is not in forbidden bitmap. On the other hand, if the path management entity wants to terminate the reservation, the slot management entity shall be able to release the slots reservation and notify its neighboring node about the new changes.

Route Discovery Entity

As above mentioned, the route discovery entity contains a routing discovery protocol for discovering routes to the destination node. Any existing reactive or hybrid routing protocols could be used to discover a path to destination. A typical route discovery protocol comprises of route request stage and route reply stage. AODV is used as an example to illustrate the process, although other protocols may also provide satisfactory results.

Figure 13:
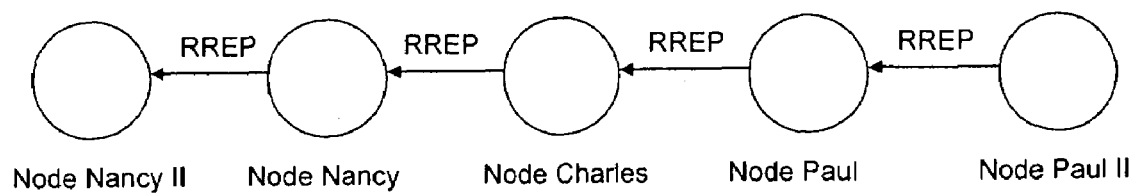
FIG. 13 is an exemplary path of nodes with notations used in the description.

For the ease of presentation, as shown in FIG. 13, the current node in question is denoted as node Charles, while the next hop of RREP and previous hop of RREP are denoted as node Nancy and node Paul respectively.

(a) Route Request Stage

Route request stage (FIG. 4) is initialized by the source node when a link reservation request is received to an unknown destination. The routing agent in the source node first checks whether there is a valid path to the destination (step 42). If not, a route request query (RREQ) packet is formatted by source node (step 43). It will broadcast the RREQ to its neighbors. The RREQ packet will be forwarded until it reaches the destination node. The routing agent in the destination node will start the route reply stage right after it receives the RREQ.

When a node, which is not source node of a route request, receives a RREQ packet from a neighbor node, it first checks whether it has received Route Reply packet (RREP) from a neighbor node. If yes, it will drop the RREQ as it is a duplicate packet for same route request. If no, it will check to see whether it itself is the destination node. If yes, it will send route reply (RREP) and goes to the route reply stage.

The above procedures follow a standard AODV routing discovery protocol. Next, three additional steps are required to insert into the existing route discovery protocols in order to facilitate bandwidth reservation.

(1) Senders of RREQ packets (Nancy) are recorded to provide backward routes to the source. Upon reception of RREQ, the device identifiers of the senders of RREQ packets are recorded in the pending reply list. Those neighbors recorded in the pending reply list must be able to reach the sources. If the protocol does not need to provide bandwidth guarantee, any neighbor in the list could be used to forward the packets. However, since the existence of a path does not guarantee any bandwidth from the source node to node Charles via a single neighbor in the list, recording all the senders of the RREQ packet in the list provides alternate paths for bandwidth reservation to increase the successful rate of route request query. This is a novel feature of multipath reservation.

(2) "RREQ Unicast" is sent to the destination when the current node in question has a valid path to the destination. As is in previous case, merely having a valid path to the destination does not mean that the path has enough bandwidth. Instead of simply sending a reply back to the source, one embodiment calls for sending a "RREQ Unicast" to destination. This can notify the destination to prepare for bandwidth reservation subsequently. In addition, sending a unicast RREQ instead of broadcasting RREQ can save network resources.

Figure 7:
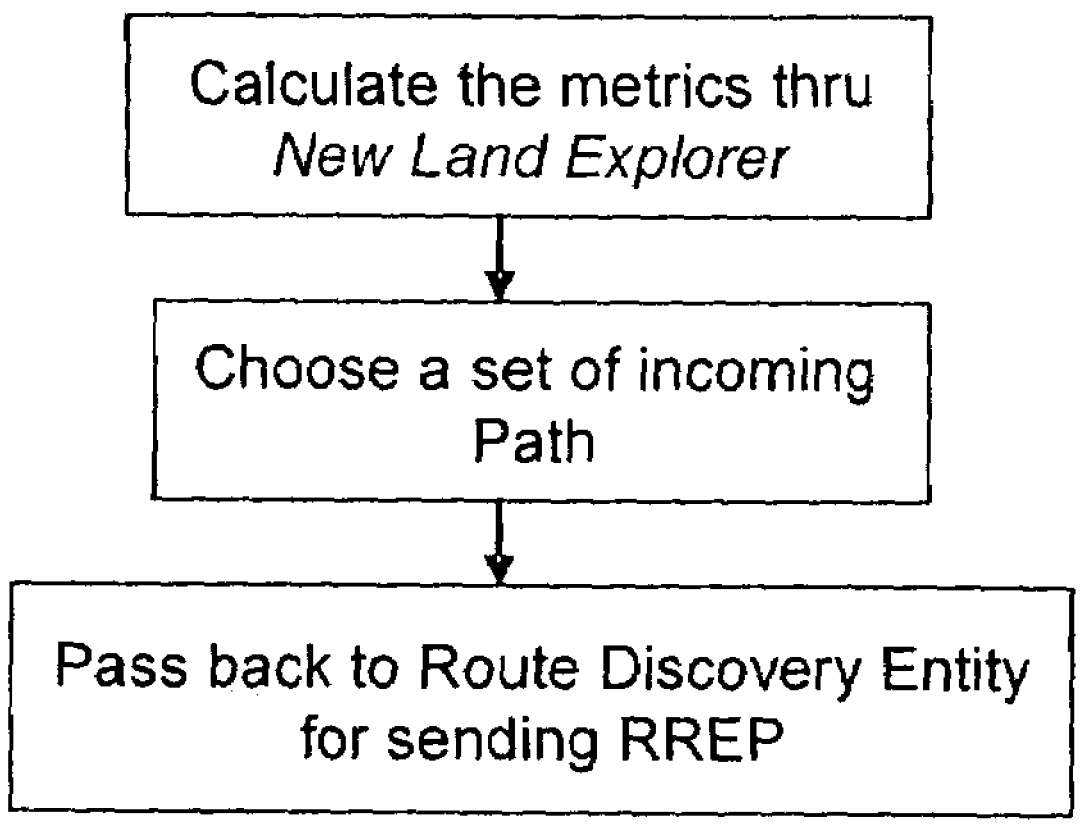
FIG. 7 is a flow chart for incoming path decision process.

(3) QoS metrics are calculated for the path through the neighbor node if the path from the source node to destination node through the neighbor node is guaranteed. The purpose of having this step is to ensure that QoS required for the resultant paths by the system is maintained. It is done by the QoS processor module. Having received packet RREQ packet from node A and RREP packet means that a path from source to destination through node A is existed and guaranteed. After the path is guaranteed, the QoS processor module will calculate the QoS metrics for the path through node A and decide if the path has fulfilled the minimum requirement of QoS and should be accepted as a candidate incoming path for the Path Management Entity. It will be followed by steps carried out by Path Management Entity as shown in FIG. 7.

(b) Route Reply Stage

Figure 5:
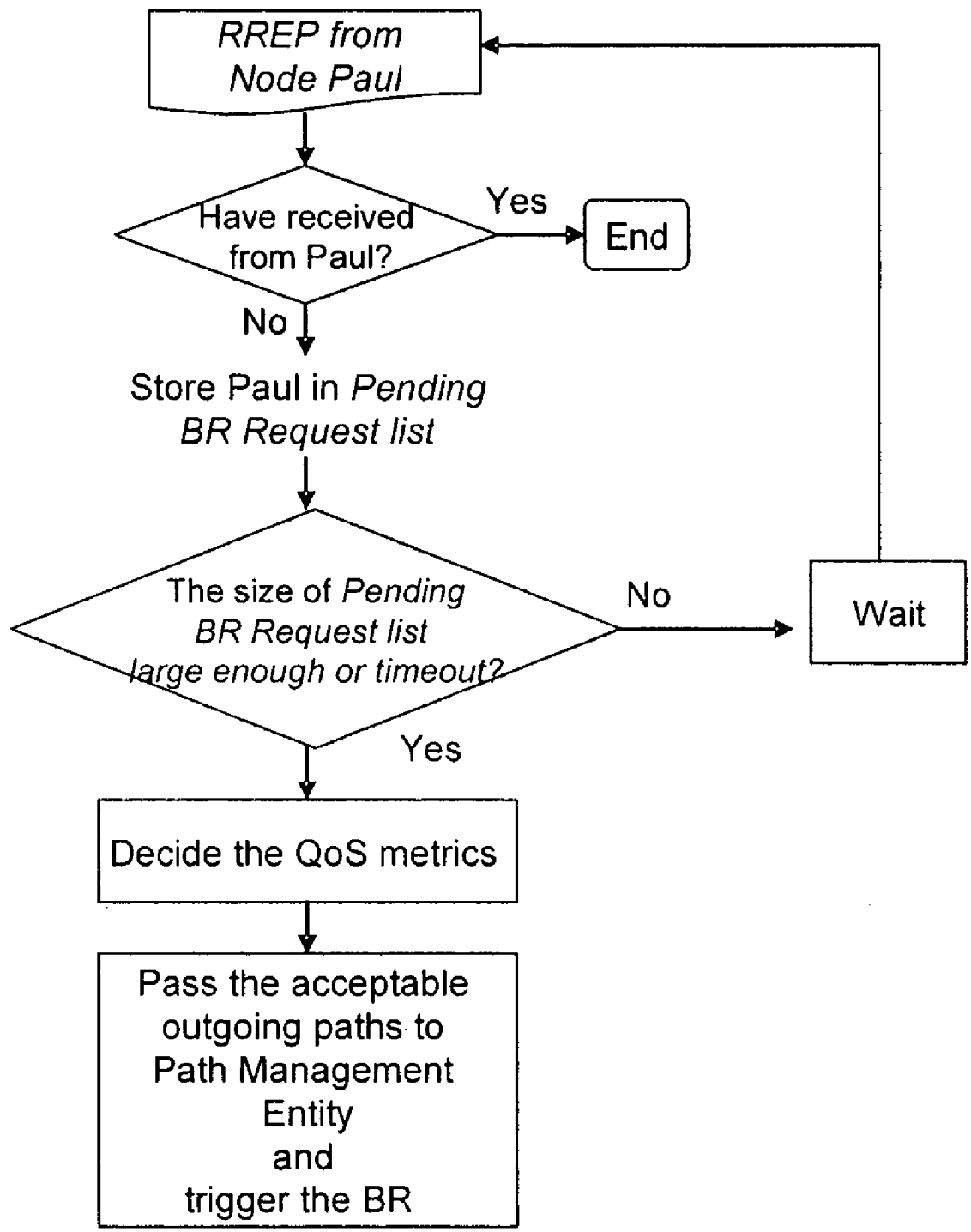
FIG. 5 is a flow chart at the route reply stage.

When RREQ (either unicast or broadcast) reaches the destination node, the route reply stage starts. The destination node sends back a route reply packet (RREP) to its neighbors after it receives a RREQ from them. The RREP is then forwarded back to the originator of the route (i.e., the source node) through all the intermediate routing nodes. The invention introduces a number of novel features to the route reply stage to ensure that bandwidth is reserved and guaranteed along the routing nodes. It is shown in FIG. 5.

(1) Bandwidth Reservation (BR) procedure starts after RREP is received in step 51. Bandwidth Reservation procedure is an important step in the process. The performance of routing protocols heavily depends on the schedule of BR procedure. Some schemes require the operation of BR procedure starts after RREQ is received. The reception of RREQ only guaranteed a path to the source node but NOT the destination nodes. It may happen that the path via the routing node in question may be unreachable to the destination node. All the BRs on this path are wasted. In the present invention, BR procedure which is carried out after RREP is received helps reduce the number of BR request. The reception of RREP means that a path to destination node is known. Since only the routing nodes that have forwarded RREQ packet are able to receive RREP packet, the reception of RREP also means that a path to the source node is also known. A reachable path to the destination node via routing node in question is guaranteed if RREP packet has been received. Hence, BR after receiving RREP can help reduce the number of BR requests. Here, BR procedure is carried out in the Path Management Entity. The Route Discovery Entity takes responsibility to pass parameters and trigger Path Management Entity to carry out BR procedure. The Route Discovery Entity can wait for a certain period to trigger BR procedure. During the waiting period, more RREP from different routing nodes can be received. This provides Path Management Entity with more choices of paths to utilize bandwidth consumption. "Bandwidth" here means a channel access unit of the communication network. In Time-division multiple access (TDMA) system, the bandwidth refers to time slots. In Frequency-division multiple access (FDMA) system, the bandwidth refers to the frequency ranges. As used here, "Bandwidth reservation" means an assignment of a set of channel access units to some dedicated nodes for exclusive use and "a bandwidth reservation procedure" is a procedure that carries out bandwidth reservation.

(2) A set of acceptable paths are selected for QoS routing protocol. For some route discovery protocols with QoS provisions, it may select a node having the optimal QoS performance metrics. However, the path with optimal QoS may not have enough bandwidth. Instead of choosing the single best QoS path, a set of acceptable nodes are selected and passed to Path Management Entity to make decision based on bandwidth consumption. In order to have more samples for selecting possible outgoing paths, node Paul who has sent the RREP to node Charles will be stored in Pending BR Request List. This process will continue until the size of the pending list is large enough or the time is out. The acceptability threshold depends on the route discovery protocol and can be predetermined. A threshold may be set to choose a set of acceptable paths.

Figure 6:
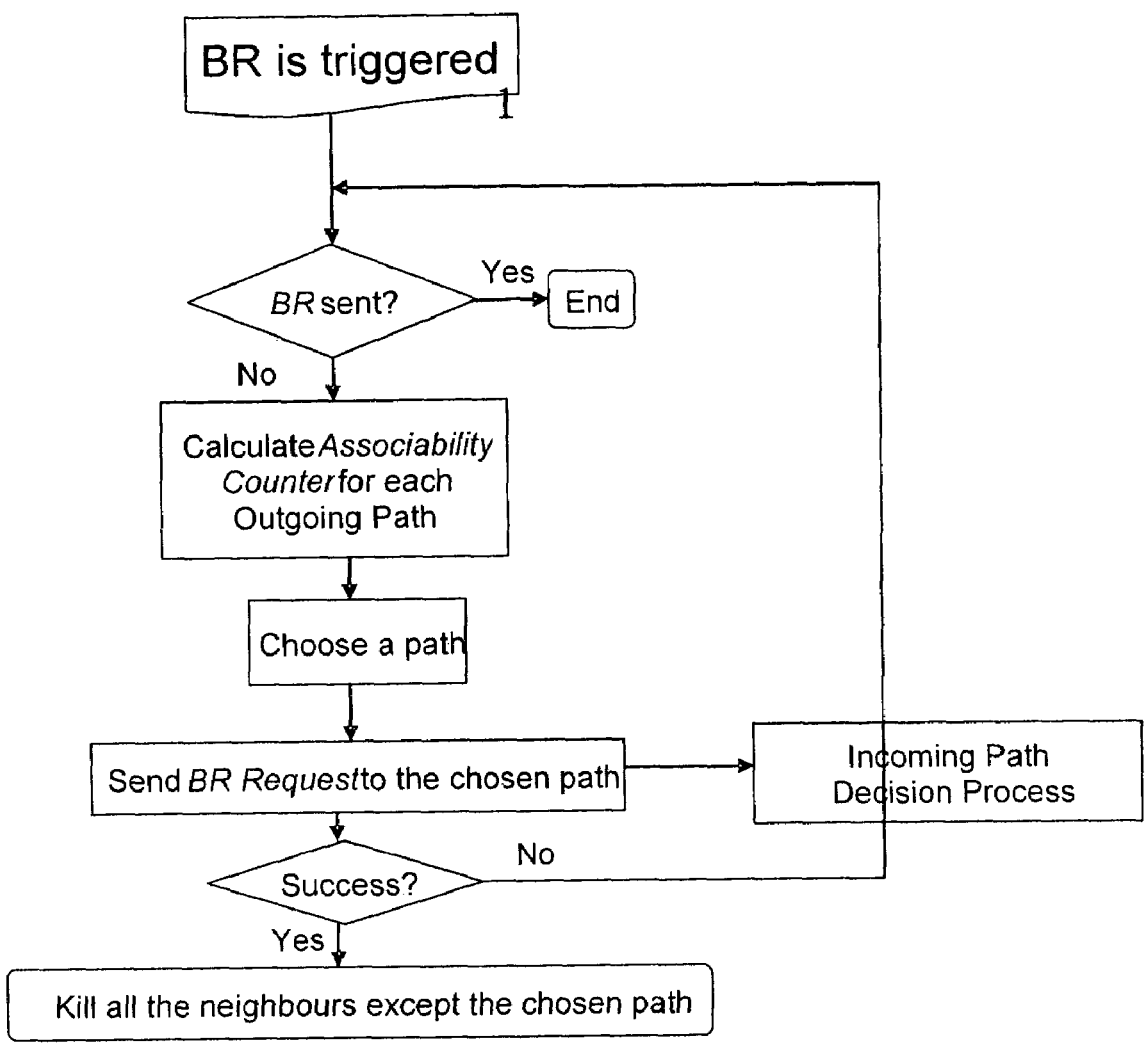
FIG. 6 is a flow chart for bandwidth reservation of outgoing path.

(3) RREP sent to node Nancy and BR sent to node Paul can be conducted at the same time. As it takes some delays to receive the BR confirmation from the node Paul, it is desirable to reduce the latency for getting response in the route discovery scheme. It can be achieved by allowing the node in question sends RREP to node Nancy and BR request to node Paul at the same time. Since in the wireless medium, the BR request to next hop can also be received by node in previous hop, the routing agent of node in the previous hop can use the information in the BR request to decide which slots should be reserved. Hence, this reduces the round-trip delay. This is shown in FIG. 6.

(4) A RREP packet may send back to more than one routing nodes. This will introduce multiple path routing reservation. More than one paths increase the route reliability and possibility of successful path bandwidth reservation. At the time when BR is triggered, bandwidth reservation is only guaranteed from the routing node in question to destination nodes. But the bandwidth from the source node to the routing node has not reserved yet. Based on the existing route discovery protocol, it is impossible to know the bandwidth availability from the source node and it changes dynamically. Also, some QoS routing protocol may use some performance metrics to guide the selection of routing nodes. The path with optimal QoS metrics does not mean that bandwidth along the path is enough for reservation. Hence, multiple path routing reservation will help the successful rate.

Figure 4:
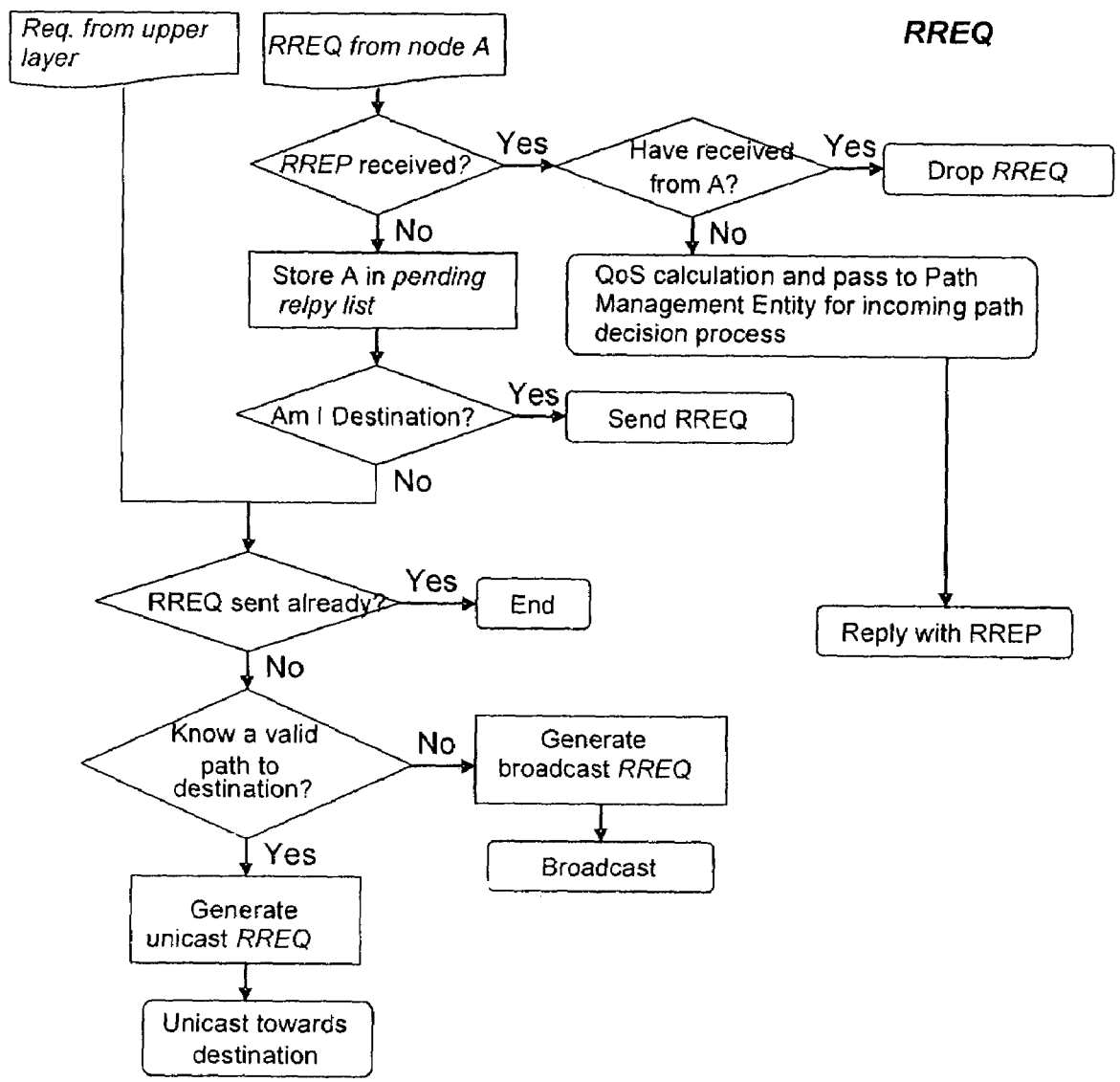
FIG. 4 is a flow chart at the route requesting stage.

RREP packet may not be sent to all neighbors who have sent RREQ packet. The choice of neighbors may affect bandwidth utilization of the network. Since it is the Path Management Entity which caters for bandwidth reservation, all the potential RREP recipients will be passed to Path Management Entity which will choose a set of RREP recipient and feed back to Route Discovery Entity (FIG. 4). The Route Discovery Entity will send RREP packet based on the feedback from Path Management Entity.

Path Management Entity

Path Management Entity is mainly responsible for establishment and maintenance of a path. It has three modules: (1) bandwidth reservation; (2) proactive route information erasure; (3) route maintenance.

Bandwidth Reservation is triggered by Route Discovery Entity. It is required to make three decisions: (1) choose an outgoing path to establish bandwidth reservation; (2) choose a set of nodes to reply RREP; and (3) confirm the incoming reservation. The core objective is to optimize bandwidth utilization given a set of potential routing nodes. As shown in FIG. 6, path selection for outgoing bandwidth reservation is conducted to choose a path that produces a minimum effect to the neighbors in terms of bandwidth utilization. For the ease of presentation, besides using node Charles and node Paul for the current node in question and previous hop of RREP packet, Node Paul II is denoted as the previous hop of RREP packet received from Paul, as shown in FIG. 13.

Referring to FIG. 6, the Route Management Entity initiates the bandwidth reservation process. Since there are more than one outgoing paths which may be able to reach the destination node, a procedure called Associability Counter calculation is added as a novel feature to select a possible path. Associability Counter is described in detail below. As shown in FIG. 6, after a path is selected, BR request will be sent to the chosen node for reserving the bandwidth and, at the same time, a set of incoming paths are selected to whom node Charles will send the RREP. The criteria to select the incoming paths are discussed below in connection with FIG. 7. It may take a while for the reservation result to be completed. If the reservation is successful, it will request all its neighbors except the chosen outgoing path to erase the information regarding the current route request about the node Charles. This step is carried out by Routing Info Eraser Module by calling the "kill-path" procedure which is described later.

Path Selection for incoming bandwidth reservation is outlined in FIG. 7. For example, Node A can request bandwidth reservation with node B only after RREP packet has been received from node B. Hence, current node in question can control the reservation of incoming path by choosing the destination nodes to receive RREP packets. As indicated in FIG. 7, the selection criterion is based on a procedure called New Land Explorer which will be described in detailed below. The selection criteria are set to ensure that the nodes consuming less bandwidth consumption and the nodes with the best QoS performance are selected. The criteria try to explore a new land by choosing the nodes that node Paul and node Paul's neighbors find impossible to explore. This can help reduce unnecessary BR. After the incoming path is chosen by New Land Explorer, the selected incoming path will be passed back to Route Discovery Entity.

Path Management Entity holds the final responsibility and authority to decide if the incoming bandwidth reservation is granted. Based on the slot availability, Slot Management Entity suggests whether the incoming bandwidth reservation should be granted. Path Management Entity normally follows the suggestion from Slot Management Entity unless one of the following events happens:

i) the route request query is timeout;

ii) It has been forced to clear all route information; or iii) The requesting node is not an accepting incoming node.

Proactive Route Information Erasure

The present invention provides a novel step of Proactive Route Information Erasure to reduce the duration of redundant reservations. Route information stored in nodes waste the nodes' resources such as memory space, processing time, etc. It also reduces the system resources. Unused bandwidth reservation may prevent other nodes from using the slots, reducing system utilization. In a known procedure in the art, the routing information erasure stage is triggered by a timeout event. Each node has a timer for each route request query. When the timer of a query A at node X is expired, node X will clear all the information about query A or set the path to destination mentioned in query A to be invalid. This is a self-control routing information erasure scheme and it is good if the routing scheme does not require bandwidth reservation. Since reservation of slots reduces the network's available bandwidth, the longer time the reservation of slots holds, the poorer the network utilization will be. Hence, simply using a time-out event is not enough to provide acceptable network utilization in a bandwidth-reservation guaranteed scheme. The present invention employs a method to erase the route information proactively.

The Routing Information Erasure has two functions. First, the initializing node can request its neighbors to remove the link information involving itself. This is the Kill-Path process. Second, the nodes in the chosen path to destination can force other non-chosen nodes to erase all the routing information about the route request query. This is the process of sending a "Thank you" message and a "Sorry" message.

(a) Kill-Path request. Only one path is left for the outgoing link. All other possible outgoing paths are regarded as redundant. To remove all the redundant paths, after receiving a confirmed BR reservation from node Y for the selected outgoing link, node X will issue a packet called 'Kill all except node Y". All X's neighbors except node Y who receive the packet should remove all the incoming links from node X.

Figure 11:
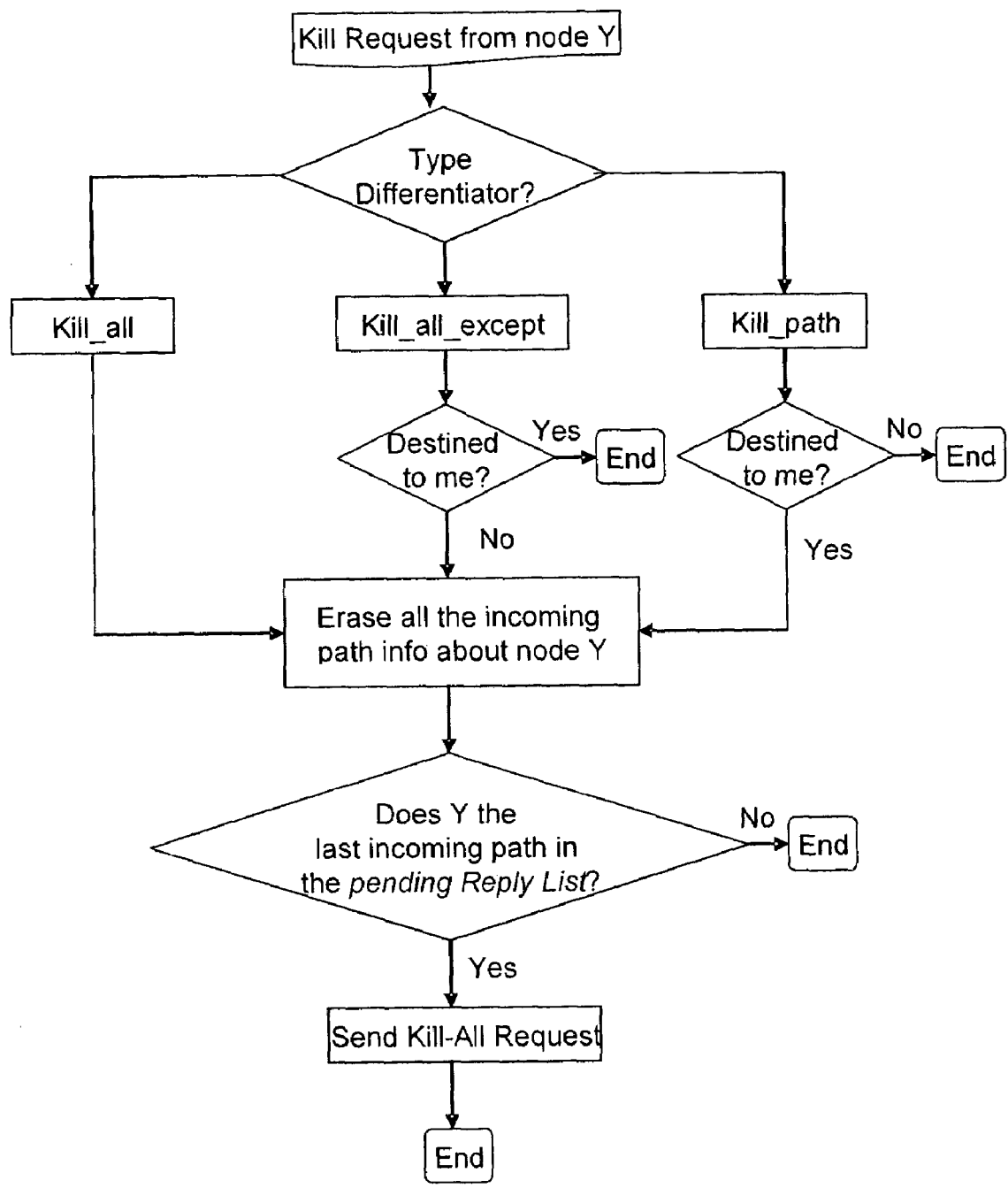
FIG. 11 is a flow chart for killing a request.

Referring to FIG. 11, three types of "Kill-Path" request are possible: "Kill_all", "Kill_all_except" and "Kill_path". FIG. 11 shows the flowchart. The node which receives the "Kill-Path" request should differentiate the types of the message first. Then, it has to decide if it itself is the intended killee. If yes, it needs to erase all the info about incoming link from node Y. Once all the incoming links are removed for that route request, it should remove all its routing information and send 'Kill All' request. When all the in-stream links have been removed, it means that the current node does not have any path from source node to itself. Hence, the current node is not involved in the final resultant path towards destination for this route request query. To save network resources, the node should remove all the route information stored in its memory and notify all its neighbors that it is not a candidate for final resultant path by sending 'Kill All' request.

Figure 10:
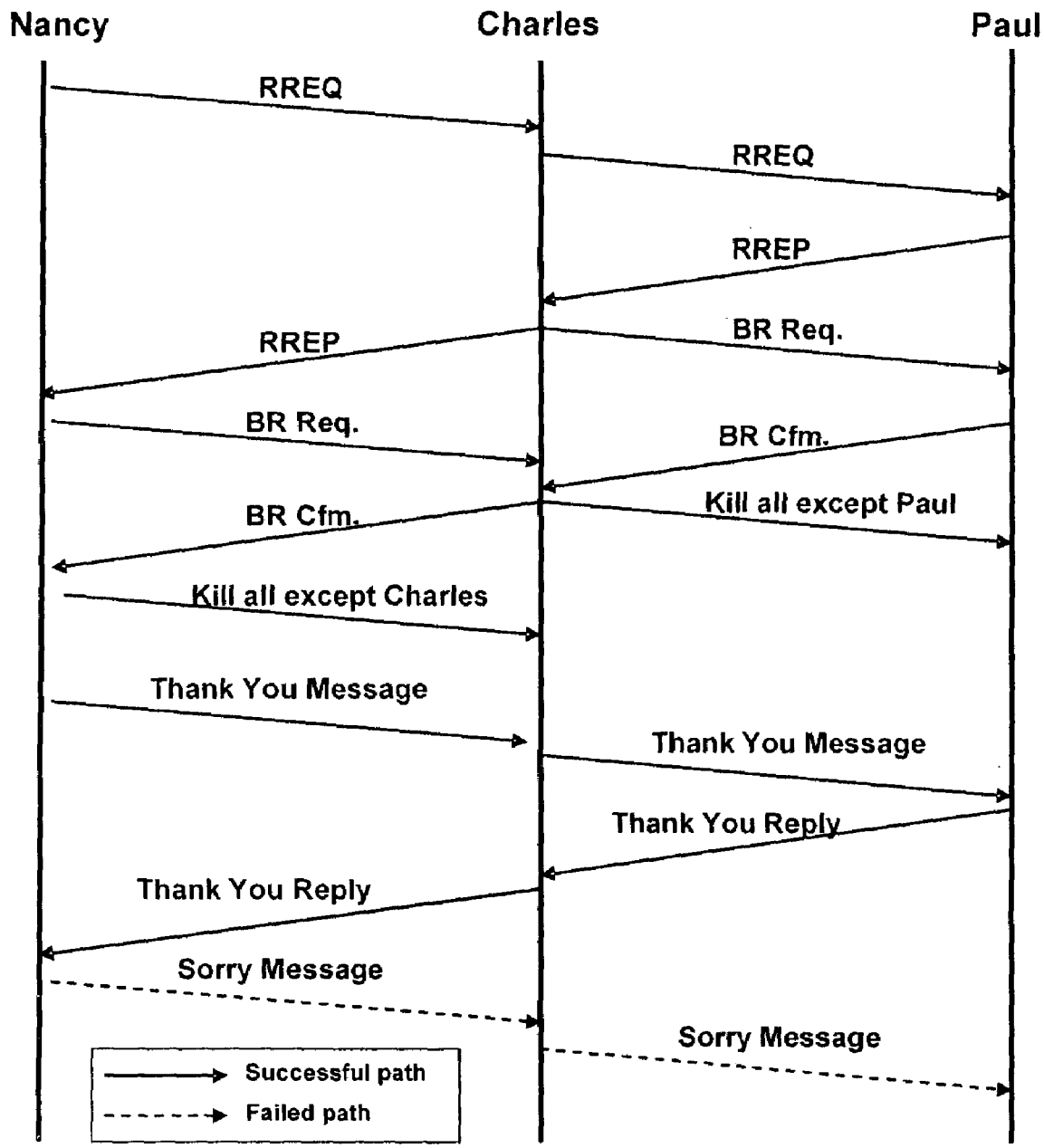
FIG. 10 shows message flows during the route discovery process of the present invention.

(b) Thank You message and Sorry message. As shown in FIG. 10, once a path has been confirmed from the source to the destination, all other paths/links which are not involved in the resultant path towards the destination will be regarded as redundant paths/links. In this case, the source node will first send a "Thank you" Messages to the selected neighbors that will be used as routing nodes towards destination for this route request query. The selected recipient of the "Thank you" Message will confirm the routing information and format the stream table for actual data transmission.

After the "Thank you" message reaches the destination, the destination will send back a Thank You Reply message to the source as an acknowledgement and confirmation of the path. When the source receives Thank You Reply message, it will issue a "Sorry" Message to all its neighbors, forcing all the neighbors that are not recipients of the "Thank you" message to clear all the routing information and remove all the bandwidth reservations made in this route request query.

Route Maintenance

The need for route maintenance is because in wireless environment nodes are free to move. When routing nodes move, they may break the established path to the destination. In some embodiments two repair procedures, Local Repair and Global Repair, are provided to overcome the problem. Global Repair restarts the route discovery process from the node before the broken node to the destination node while Local Repair negotiates with the neighborhood to recover the path.

The choice between the methods to repair may depend on a metric called path maintainability, which is defined as the number of consecutive broken nodes the path can recover from. It is determined by the availability of n-hop information, i.e., path maintainability=n−1, where n-hop info are available. If the number of broken nodes is more than path maintainability, Global Repair is required, or vice versa.

Figure 12:
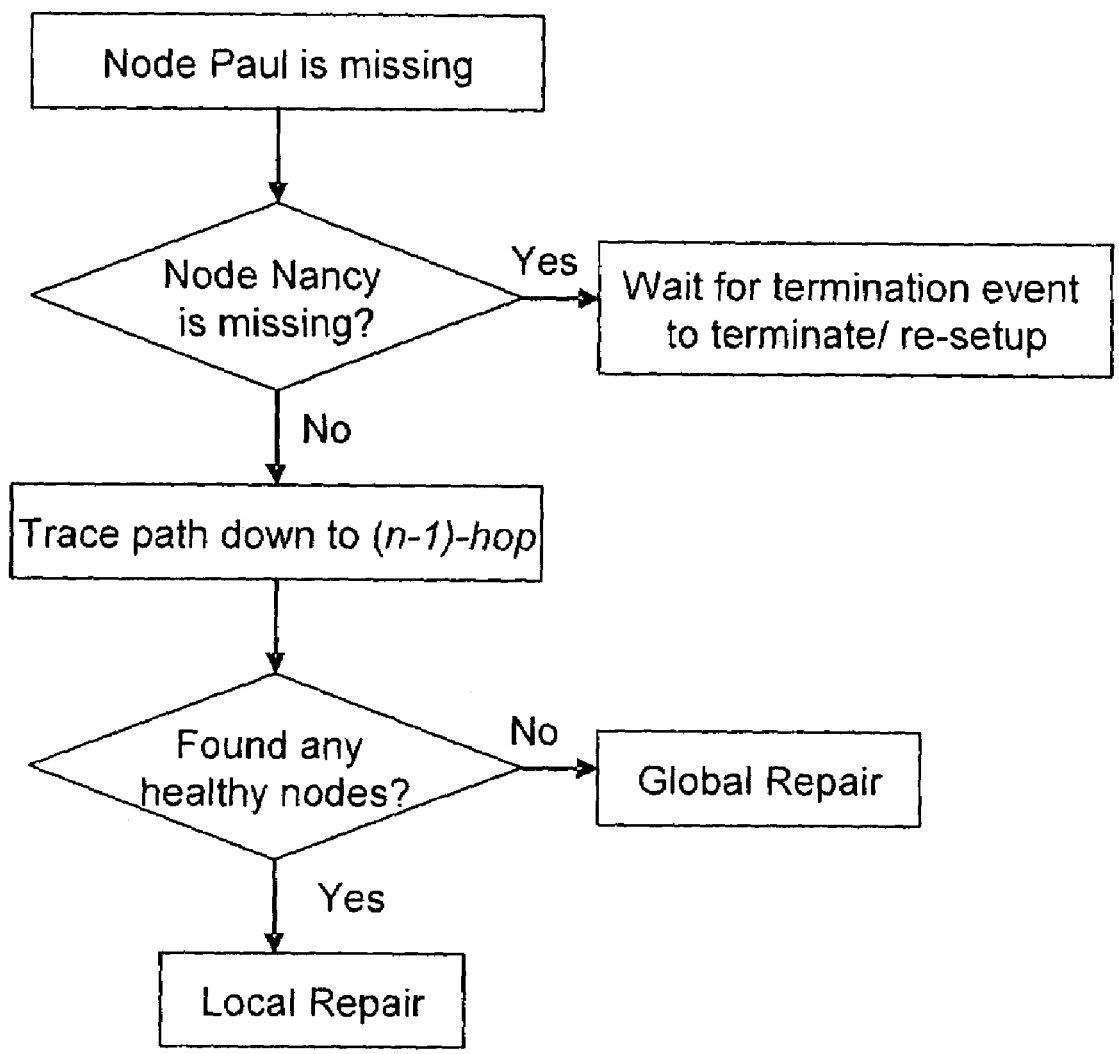
FIG. 12 is a flow chart for route maintenance.

As shown in FIG. 12, for detection of broken path, node Charles periodically checks the existence of connection to node Paul. If node Paul is missing, node Charles will check the existence of node Nancy. If both are missing, Node Charles can declare itself as a broken node. It will wait for a termination timeout event to erase all the routing information and terminate itself as a routing node for the path or wait for re-establishment of the links by its neighbors. If on the other hand node Nancy exists but node Paul does not, node Charles may need to trace down to n−1 node whose distance is n hop away towards destination node to see if there is a routing node whose distance is less than n hops away from node Charles towards destination is not broken based on the n-hop information. If the closest healthy node distance is less than or equal to path maintainability, Local Repair will be initialized. If not, it will request the Global Repair.

If the broken node is the destination, node Charles needs to find out whether the destination is within n-hop. If not, a global repair is necessary.

(a) Global Repair. Node Charles starts a new repair route request query (RRREQ) and set the repair source as node charles' address. The RRREQ will be forwarded to the destination. The process is the same as the normal RREQ. The only difference is that the RREP should be sent to the repair source node instead of the original source node.

(b) Local Repair. When local Repair is initialized, node Charles, based on the n-hop information, chooses a set of neighbors that can act as routing nodes to the next available healthy node for the path. The information is passed back to the Route Discovery Protocol to determine a set of acceptable neighbors whose QoS is acceptable. Node Charles chooses a set of the acceptable neighbors that is bandwidth efficient and request BR to them. The above process is repeated for each routing node whose has been requested BR from its previous hop until the BR reaches the next available healthy node. The healthy node will decide the most bandwidth efficient path and kill all other paths. The Local repair is then completed.

Slot Management Entity

The existing BR scheme in MAC layer is not very suitable for BR for multi-hop routing protocols especially when it supports multi-path reservations. The performance will be degraded due to contention for slots when two nodes are requesting the same set of slots to the destination node at the same time. More specifically, it would result in three problems:

(1) Response time is increased: This is mainly due to the fact that two nodes would normally receive RREP at the same time from their previous hop of RREP. For example, in FIG. 8(a), Charles may send RREP to his Nancy's at the same time, triggering both Nancy1 and Nancy2 to request BR reservation. The slot bitmaps they are checking for may not include the newest slot reservation status from their counterparts. Hence, they will request same set of slots if the static allocation scheme is used. When this happens, the destination will reject one of two requesting nodes. This turns out increasing the response time. To solve this, a solution in prior art requires that Charles does not send RREP to his two Nancy(s) at the same time but with some time delay. However, this will also increase the response time and the complexity of the protocols.

(2) The successful rate of route request query is reduced: The contention of the slots in node Charles in FIG. 8(a) may result in a situation where the path with not enough bandwidth obtains the slot. The other node Nancy with enough path bandwidth will stop any further reservation requests. Hence this contention reduces the successful rate.

Figure 8:
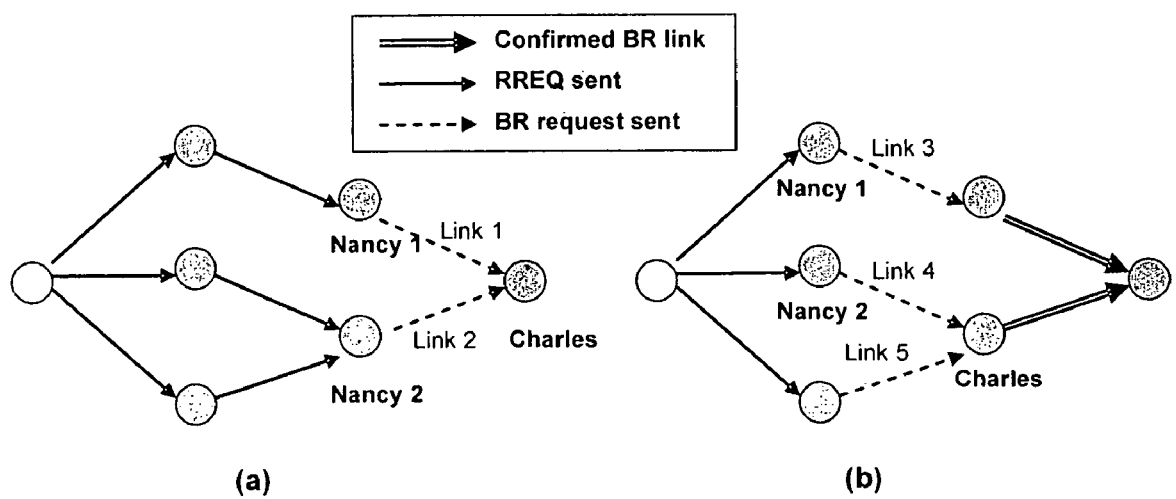
FIG. 8 show a bandwidth reservation problem in existing routing protocol-slot contention (prior art)

(3) Network utilization is reduced: As mentioned above, the result of route discovery query shall be only one path to destination. During the process of route discovery, the BR scheme will use mutually-exclusive slots for each link. As shown in FIG. 8(b), the number of slots being used will be huge, reducing network utilization.

In some embodiments, in order to reduce the bandwidth reservation usage during route discovery, one or more of the following enhancements on the standard BR are added.

(1) Special Mark for slots that are reserved for route request query. To solve the slot contention problem, slots reserved for different route request query are made distinguishable. A separate frame that is attached to the slot bitmap to indicate that each reserved slot will have its status marked as "Routing" and with a Route Request Identifier (RRI) to distinguish it from the normal BR reservation.

Figure 9:
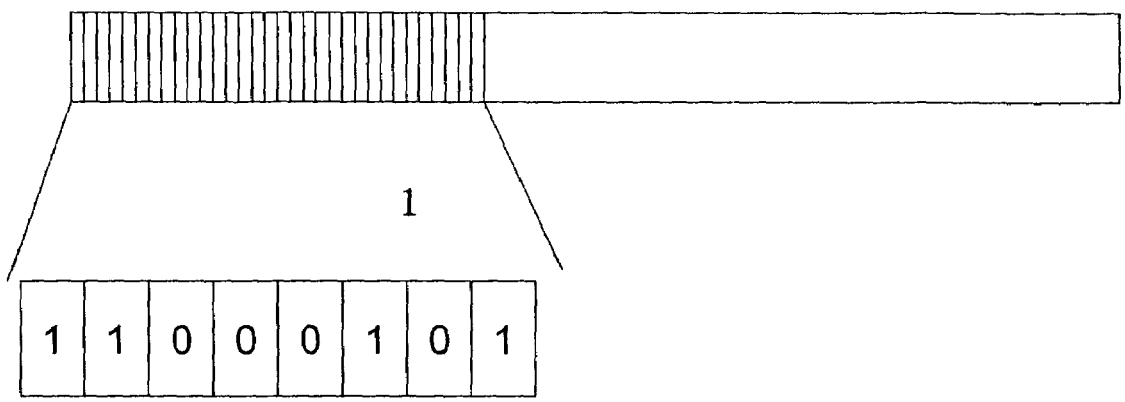
FIG. 9 is diagram showing the forbidden bitmap in a node.

(2) Simultaneous uses of the reserved slots in the same route request are allowed. The reservations of slots are granted if the slots are not in the forbidden bitmap of the nodes involved and a slot may subject to multiple reservations as long as it is not put in the forbidden bitmap. As indicated in FIG. 9, each node maintains a forbidden bitmap for each route request. There are two statuses for each slot: 0 and 1, indicting a slot being "available" and "forbidden to use", respectively.

slot[n] of node X for route request query A is set to be forbidden if it fulfilled the following condition:

i) slot[n] is used in the outgoing link of node X for A; or ii) slot[n] is used in the outgoing link of node X-k for A, for some k where node X-k is defined as the node which is k-hop away from node X along the reserved path toward the destination and within the transmission range of node X.

The formation of the forbidden list is based on the fact that only the slots used for same path to the destination and used by the nodes within the transmission range of the node in question cannot be reserved for the BR in the same route request query. All other slots that are used either by neighbors or itself can be temporarily used for BR. This is mainly because in the end, only one path is remained for data transfer between the source node and destination node. All the redundant paths are being killed or terminated. Therefore, slots that are not in forbidden bitmap can be reused.

Associability Counter

It is observed that each neighbors of node Paul will consume two times the requested bandwidth for the path reservation. It is mainly due to hidden node problem: every node which hears neighbors' bandwidth reservation shall set the corresponding reserved slots as unavailable. Since node Charles is chosen as routing node for the path, its non-routing neighbors take up at least two times the requested bandwidth to protect the path reservation (the first bandwidth is to protect incoming reservation and the other is to protect outgoing reservation with regards to node Charles).

Moreover, it is further observed that node Charles's neighbors which contain Paul II consume four times the requested bandwidth. Due to hidden node problem, those non-routing neighbors of node Charles containing Paul II are required to protect the BR between Charles and Paul and BR between Paul and Paul II. Each protection consumes two sets of the requested bandwidth. Hence, the more neighbors of node Charles there is containing Paul II, the more bandwidth may be consumed in neighbors of routing nodes along the path.

The above observations introduce two different effects on networks with different node distributions. In a network with uneven node distribution, if a path is routed through a congested area, more nodes are required to set the corresponding slots reserved by the path as unavailable, making the congested area even more congested. On the other hand, if the path is routed through a rural area, it passes through less number of nodes, making less number of slots in the network unavailable.

In a network with even node distribution, there may be a shielding effect to the routing node. "A routing node" here refers to the node that resides along the path connecting the source node and destination node to forward the packet.

The shielding effect means that the current node in question has enough bandwidth for reservation but its neighbors do not have enough bandwidth. This makes the current node in question unable to make a request with any other nodes even though it has enough bandwidth for reservation. There are two findings that govern the shielding effects:

1) The amount of bandwidth consumed by a neighboring node=2*requested bandwidth*Number of routing nodes of the neighboring node hears 2) Routing nodes must consume more bandwidth than source node and destination node. For the length of the path which is more than 2 hops, the source and destination node consumes two times the requested bandwidth. The routing node that is the next hop of source node or the previous hop of destination node consumes 3 times the requested bandwidth while the rest of routing nodes consume 4 times the requested bandwidth From the above findings, it is observed that the neighboring nodes which may not be involved in routing path consumes a huge amount of bandwidth. Since the routing nodes must consume more bandwidth than the source node and destination node. It may happen that the source node has enough bandwidth but its surrounding nodes do not have sufficient bandwidth to start bandwidth reservation. This introduces the shielding effect, worsening the network performance.

To solve the above problem, a method called Association Counter is provided in the present invention. The purpose of the Association Counter is to minimize the number of neighbors around the path. Each incoming RREP packet is regarded as a possible outgoing path. After the route discovery protocol has decided a set of acceptable outgoing path from possible outgoing path (determined by QoS metrics in Route Discovery Entity), degree of associability can be defined and calculated as follow:

$$OneAssoc_i = \sum_{n \in X} 1$$

$$TwoAssoc_i = \sum_{n \in \Phi} 1$$

$$\Rightarrow Assoc_i = 2 * OneAssoc_i + 4 * TwoAssoc_i$$

where $Assoc_i$ is the overall assoicability of path i $OneAssoc_i$ is one hop associability of path i $TwoAssoc_i$ is two hop associability of path i X is a set of neighbours that node Paul has.

$\Phi$ is a set of neighbours of node Charles that contains node Paul II.

The path with minimum degree of associability will be chosen as the outgoing path for node Charles.

New Land Explorer

New Land Explorer is responsible for selection the destination of RREP packet based on the following criteria:

Node A (a neighbor of node Charles) is chosen as destination of RREP packet from node Charles if (i) node A is acceptable incoming path (decided by QoS metrics from route discovery entity); and one of the following:

(ii) node A obtains the best value in QoS metrics; or (iii) node A does not have common neighbors as node Paul except node Charles.

The above criterion ensures that the node consuming less bandwidth consumption and the node with the best QoS performance are selected. Referring to the disclosure in Route Discovery Entity, more than one RREP packets can be sent in this case.

Criterion (iii) reduces the number of node involving BR during the route discovery period. It is undesirable to send RREP to all acceptable nodes to carry out BR, which will reduce instantaneous bandwidth efficiency and increase power consumption of the network. Criterion (iii) tries to explore a new land by choosing the nodes that node Paul and node Paul's neighbors find impossible to explore. This can help reduce unnecessary BR.

While there have been described and pointed out fundamental novel features of the invention as applied to a preferred embodiment thereof, it will be understood that various omissions and substitutions and changes, in the form and details of the processes and methods illustrated, may be made by those skilled in the art without departing from the spirit of the invention. For example, it is expressly intended that all combinations of those elements of method steps which perform substantially the same function in substantially the same way to achieve the same results are within the scope of the invention.

The invention is not limited by the embodiments described above which are presented as examples only but can be modified in various ways within the scope of protection defined by the appended patent claims.

What is claimed is:

1. A routing method for communication from a source node to a destination node in a distributed wireless network which comprises a plurality of wireless mobile nodes, at least one of the mobile nodes being a source node and at least one of the mobile nodes being a destination node, the method comprising:
   (1): generating a query where a route request query packet is sent from said source node, relayed by one or more said mobile nodes along one or more paths, and received by said destination node;
   (2): sending a route reply packet from said destination node upon receiving said route request query packet, the route reply packet being relayed by one or more said mobile nodes along one or more paths, and received by said source node which has sent said route request query packet;
   (3): reserving bandwidth while sending said route reply packet at each said mobile node that receives said route reply packet, wherein one or more paths with bandwidth reservation from said source node to said destination node is generated, wherein during bandwidth reservation a mark is used for marking slots that are reserved for route request query so that they are distinguished from slots subject to other types of bandwidth reservation, wherein during bandwidth reservation a slot is permitted for simultaneous reservations, and wherein a forbidden list of slots is maintained, which provides a mechanism to allow simultaneous reservations on a single slot;
   (4): selecting an outgoing path, wherein a single path is selected from said one or more generated paths with bandwidth reservation in (3); and
   (5): removing bandwidth reservation from each mobile node which has bandwidth reservation but is not in said path selected in (4).

2. The method of claim 1 further comprising:
   (1a): selecting an incoming path from said one or more paths which relayed said route request query packet from said source node to said destination node in (1) to relay said route reply packet from said destination node to said source node in (2).

3. The method of claim 2, further comprising:
   (6): detecting a broken path, wherein each mobile node in said single path selected in (4) periodically checks the existence of connection to one or more neighboring nodes, and determines whether said path is broken and if broken whether a global repair or a local repair is to be performed.

4. The method of claim 2, wherein QoS metrics for a mobile node are generated during (1) and used as a basis for incoming path selection performed in (1a).

5. The method of claim 1, wherein in (4) each node that constitutes said single outgoing path is selected because of its minimum degree associability.

6. The method of claim 1, wherein in (5), the removal of bandwidth reservation is carried out and triggered by said each mobile node without needing a timeout event counter.

7. The method of claim 2, wherein in (1) Incoming Request Device Information is recoded by each said mobile node receiving a route request query packet and in (1a) one or more incoming paths are selected based on QoS evaluation by a QoS processor.

8. The method of claim 7, wherein in (1a) said QoS evaluation is based on QoS metrics for each incoming path.

9. The method claim 7, wherein in (1a) said one or more incoming paths are selected further because each selected path does not have common neighbors as next hop along said path.

10. The method of claim 1, wherein in (4) each node that constitutes said single path is selected because it causes minimum bandwidth consumption by neighboring nodes, said bandwidth consumption being assessed by an Associability Counter.

11. The method of claim 10, where said Associability Counter is determined by the number of neighbors that a mobile node has.

12. A routing method for communication from a source node to a destination node in a distributed wireless network which comprises a plurality of wireless mobile nodes, at least one of the mobile nodes being a soure node and at least one of the mobile nodes being a destination node, the method comprising:
   (1): generating a query where a route request query packet is sent from said source node, relayed by one or more said mobile nodes along one or more paths, and received by said destination node;
   (2): sending a route reply packet from said destination node upon receiving said route request query packet, the route reply packet being relayed by one or more said mobile nodes along one or more paths, and received by said source node which has sent said route request query packet;
   (3): reserving bandwidth while sending said route reply packet at each said mobile node that receives said route reply packet, wherein one or more paths with bandwidth reservation from said source node to said destination node is generated;
   (4): selecting an outgoing path, wherein a single path is selected from said one or more generated paths with bandwidth reservation in (3); and
   (5): removing bandwidth reservation from each mobile node which has bandwidth reservation but is not in said path selected in (4), wherein in (4) each node that constitutes said single path is selected because it cc uses minimum bandwidth consumption by neighboring nodes, said bandwidth consumption being assessed by an Associability Counter, and wherein said Associability Counter is determined by the number of neighbors that a mobile node has; and furthermore, wherein the Associability Counter is determined by the following formula:

$$OneAssoc_i = \sum_{n \in X} 1$$

$$TwoAssoc_i = \sum_{n \in \Phi} 1$$

$$\Rightarrow Assoc_i = 2 * OneAssoc_i + 4 * TwoAssoc_i$$

where $Assoc_i$ is Associability Counter of path i;

$OneAssoc_i$ is one hop associability of path i;

$TwoAssoc_i$ is two hop associability of path i;

X is a set of immediate next neighbours that node A has;

$\Phi$ is a set of next neighbours of node B that contains node C; and

B, A, C are in path I in which a RREP is related from C to A to B.

13. The method of claim 3, where a local repair is selected if the linkage status of mobile nodes with some hop distances away from said broken node in (6) are available and some said mobile nodes' linkage to said destination node are not broken.

* * * * *